(12) United States Patent
Frank et al.

(10) Patent No.: US 7,870,271 B2
(45) Date of Patent: *Jan. 11, 2011

(54) DISK DRIVE PARTITIONING METHODS AND APPARATUS

(76) Inventors: Charles Frank, 62 Wheeler, Irvine, CA (US) 92620; Thomas Ludwig, 4800 Camino Costado, San Clemente, CA (US) 92673; Thomas Hanan, 27022 Manscal, Mission Viejo, CA (US) 92691; William Babbitt, 22350 Gavilan Rd., Perris, CA (US) 92570

( * ) Notice: Subject to any disclaimer, the term of this patent is extended or adjusted under 35 U.S.C. 154(b) by 886 days.

This patent is subject to a terminal disclaimer.

(21) Appl. No.: 11/243,143

(22) Filed: Oct. 3, 2005

(65) Prior Publication Data

US 2006/0026258 A1 Feb. 2, 2006

Related U.S. Application Data

(62) Division of application No. 10/473,509, filed as application No. PCT/US02/040199 on Dec. 16, 2002.

(60) Provisional application No. 60/425,867, filed on Nov. 12, 2002.

(51) Int. Cl.
*G06F 15/16* (2006.01)

(52) U.S. Cl. .................... 709/229; 711/209

(58) Field of Classification Search ............. 709/201, 709/203, 211–217, 223, 229, 238; 711/209
See application file for complete search history.

(56) References Cited

U.S. PATENT DOCUMENTS 4,422,171 A 12/1983 Wortley 4,890,227 A 12/1989 Watanabe et al.

(Continued)

FOREIGN PATENT DOCUMENTS

CN 1359214 7/2002

(Continued)

OTHER PUBLICATIONS

Lin JC and Paul S, "RMTP: a reliable multicast transport protocol," Proceedings of IEEE INFOCOM '96, vol. 3, pp. 1414-1424, 1996.

(Continued)

*Primary Examiner*—Saleh Najjar
*Assistant Examiner*—Marie Georges Henry
(74) *Attorney, Agent, or Firm*—Schwabe, Williamson & Wyatt, P.C.

(57) ABSTRACT

A storage device has partitions that are separately addressed by distinct IP addresses. This allows direct access of the partitions, on a peer-to-peer basis, by any other device that can communicate using IP. Preferred storage devices support spanning between or among partitions of the same device, as well as between or among different storage devices. Both multicast and proxy spanning are contemplated. Combinations of the inventive storage devices with each other, and with prior art storage devices are contemplated, in all manner of mirroring and other arrangements. In still other aspects of the invention, a given storage device can comprise one or more types of media, including any combination of rotating and non-rotating media, magnetic and optical, and so forth.

25 Claims, 4 Drawing Sheets

U.S. PATENT DOCUMENTS

| | | |
|---|---|---|
| 5,129,088 A | 7/1992 | Auslander et al. |
| 5,193,171 A | 3/1993 | Shinmura et al. |
| 5,444,709 A | 8/1995 | Riddle |
| 5,506,969 A | 4/1996 | Wall et al. |
| 5,546,541 A | 8/1996 | Drew et al. |
| 5,590,124 A | 12/1996 | Robins |
| 5,590,276 A | 12/1996 | Andrews |
| 5,634,111 A | 5/1997 | Oeda et al. |
| 5,742,604 A | 4/1998 | Edsall et al. |
| 5,758,050 A | 5/1998 | Brady et al. |
| 5,758,188 A | 5/1998 | Appelbaum et al. |
| 5,771,354 A | 6/1998 | Crawford |
| 5,850,449 A | 12/1998 | McManis |
| 5,867,686 A | 2/1999 | Conner et al. |
| 5,884,038 A * | 3/1999 | Kapoor .................... 709/226 |
| 5,889,935 A | 3/1999 | Ofek et al. |
| 5,930,786 A | 7/1999 | Carino, Jr. et al. |
| 5,937,169 A | 8/1999 | Connery et al. |
| 5,948,062 A | 9/1999 | Tzelnic |
| 5,949,977 A | 9/1999 | Hernandez |
| 5,983,024 A | 11/1999 | Fye |
| 5,991,891 A | 11/1999 | Hahn et al. |
| 6,018,779 A | 1/2000 | Blumenau |
| 6,081,879 A | 6/2000 | Arnott |
| 6,101,559 A | 8/2000 | Schultz et al. |
| 6,105,122 A | 8/2000 | Muller et al. |
| 6,128,664 A * | 10/2000 | Yanagidate et al. ......... 709/228 |
| 6,157,935 A | 12/2000 | Tran et al. |
| 6,157,955 A | 12/2000 | Narad et al. |
| 6,202,060 B1 | 3/2001 | Tran |
| 6,246,683 B1 | 6/2001 | Connery et al. |
| 6,253,273 B1 | 6/2001 | Blumenau |
| 6,259,448 B1 | 7/2001 | McNally |
| 6,275,898 B1 | 8/2001 | DeKoning |
| 6,288,716 B1 | 9/2001 | Humpleman et al. |
| 6,295,584 B1 | 9/2001 | DeSota et al. |
| 6,330,236 B1 | 12/2001 | Ofek et al. |
| 6,330,615 B1 * | 12/2001 | Gioquindo et al. ......... 709/236 |
| 6,377,990 B1 | 4/2002 | Slemmer |
| 6,385,638 B1 | 5/2002 | Baker-Harvey |
| 6,389,448 B1 | 5/2002 | Primak |
| 6,396,480 B1 | 5/2002 | Schindler et al. |
| 6,401,183 B1 * | 6/2002 | Rafizadeh .................. 711/173 |
| 6,434,683 B1 | 8/2002 | West et al. |
| 6,449,607 B1 | 9/2002 | Tomita et al. |
| 6,466,571 B1 | 10/2002 | Dynarski et al. |
| 6,473,774 B1 | 10/2002 | Cellis et al. |
| 6,480,934 B1 | 11/2002 | Hino et al. |
| 6,487,555 B1 | 11/2002 | Bharat et al. |
| 6,549,983 B1 | 4/2003 | Han et al. |
| 6,567,863 B1 * | 5/2003 | Lafuite et al. .................. 710/8 |
| 6,601,101 B1 | 7/2003 | Lee et al. |
| 6,601,135 B1 | 7/2003 | McBrearty et al. |
| 6,618,743 B1 | 9/2003 | Bennett |
| 6,629,162 B1 | 9/2003 | Arndt |
| 6,629,264 B1 | 9/2003 | Sicola et al. |
| 6,636,958 B2 * | 10/2003 | Abboud et al. .............. 711/173 |
| 6,678,241 B1 | 1/2004 | Gai |
| 6,681,244 B1 | 1/2004 | Cross et al. |
| 6,683,883 B1 | 1/2004 | Czeiger et al. |
| 6,693,912 B1 | 2/2004 | Wang |
| 6,701,431 B2 | 3/2004 | Subramanian et al. |
| 6,701,432 B1 | 3/2004 | Deng et al. |
| 6,711,164 B1 | 3/2004 | Le et al. |
| 6,728,210 B1 | 4/2004 | El-Khoury |
| 6,732,171 B2 | 5/2004 | Hayden |
| 6,732,230 B1 | 5/2004 | Johnson et al. |
| 6,741,554 B2 | 5/2004 | D'Amico et al. |
| 6,754,662 B1 | 6/2004 | Li |
| 6,757,845 B2 | 6/2004 | Bruce |
| 6,772,161 B2 | 8/2004 | Mahalingam |
| 6,775,672 B2 | 8/2004 | Mahalingam et al. |
| 6,775,673 B2 | 8/2004 | Mahalingam et al. |
| 6,795,534 B2 | 9/2004 | Noguchi |
| 6,799,244 B2 | 9/2004 | Tanaka et al. |
| 6,799,255 B1 | 9/2004 | Blumenau et al. |
| 6,834,326 B1 | 12/2004 | Wang et al. |
| 6,853,382 B1 | 2/2005 | Van Dyke et al. |
| 6,854,021 B1 | 2/2005 | Schmidt et al. |
| 6,862,606 B1 | 3/2005 | Major et al. |
| 6,876,657 B1 | 4/2005 | Brewer et al. |
| 6,882,637 B1 | 4/2005 | Le |
| 6,886,035 B2 | 4/2005 | Wolff |
| 6,894,976 B1 | 5/2005 | Banga et al. |
| 6,895,461 B1 | 5/2005 | Thompson |
| 6,895,511 B1 * | 5/2005 | Borsato et al. .................. 726/5 |
| 6,901,497 B2 | 5/2005 | Tashiro et al. |
| 6,907,473 B2 | 6/2005 | Schmidt et al. |
| 6,912,622 B2 | 6/2005 | Miller |
| 6,917,616 B1 | 7/2005 | Normand et al. |
| 6,922,688 B1 | 7/2005 | Frey, Jr. |
| 6,928,473 B1 | 8/2005 | Sundaram et al. |
| 6,934,799 B2 | 8/2005 | Acharya et al. |
| 6,941,555 B2 | 9/2005 | Jacobs et al. |
| 6,947,430 B2 | 9/2005 | Bilic et al. |
| 6,978,271 B1 | 12/2005 | Hoffman |
| 6,983,326 B1 | 1/2006 | Vigue |
| 6,985,956 B2 * | 1/2006 | Luke et al. ................... 709/229 |
| 6,993,587 B1 | 1/2006 | Basani |
| 7,039,934 B2 | 5/2006 | Terakado et al. |
| 7,051,087 B1 | 5/2006 | Bahl et al. |
| 7,065,579 B2 | 6/2006 | Traversat et al. |
| 7,069,295 B2 * | 6/2006 | Sutherland et al. .......... 709/203 |
| 7,072,823 B2 | 7/2006 | Athanas et al. |
| 7,072,986 B2 | 7/2006 | Kitamura et al. |
| 7,073,090 B2 | 7/2006 | Yanai et al. |
| 7,111,303 B2 | 9/2006 | Macchiano et al. |
| 7,120,666 B2 | 10/2006 | McCanne et al. |
| 7,145,866 B1 | 12/2006 | Ting et al. |
| 7,149,769 B2 | 12/2006 | Lubbers et al. |
| 7,152,069 B1 * | 12/2006 | Santry et al. ................. 707/100 |
| 7,184,424 B2 | 2/2007 | Frank et al. |
| 7,188,194 B1 | 3/2007 | Kuik et al. |
| 7,203,730 B1 | 4/2007 | Meyer et al. |
| 7,206,805 B1 | 4/2007 | McLaughlin, Jr. |
| 7,225,243 B1 | 5/2007 | Wilson |
| 7,237,036 B2 | 6/2007 | Boucher et al. |
| 7,243,144 B2 | 7/2007 | Miyake |
| 7,254,620 B2 | 8/2007 | Iwamura et al. |
| 7,260,638 B2 | 8/2007 | Crosbie |
| 7,263,108 B2 * | 8/2007 | Kizhepat .................... 370/473 |
| 7,278,142 B2 | 10/2007 | Bandhole et al. |
| 7,296,050 B2 * | 11/2007 | Vicard ....................... 709/201 |
| 7,353,266 B2 | 4/2008 | Bracewell et al. |
| 7,415,018 B2 | 8/2008 | Jones et al. |
| 7,428,584 B2 | 9/2008 | Yamamoto et al. |
| 7,436,789 B2 | 10/2008 | Caliskan et al. |
| 7,447,209 B2 | 11/2008 | Jeffay et al. |
| 7,463,582 B2 | 12/2008 | Kelly et al. |
| 7,475,124 B2 | 1/2009 | Jiang |
| 7,535,913 B2 | 5/2009 | Minami |
| 7,742,454 B2 | 6/2010 | Venkatsubra |
| 2001/0020273 A1 | 9/2001 | Murakawa |
| 2001/0026550 A1 | 10/2001 | Kobayashi |
| 2001/0034758 A1 | 10/2001 | Kikinis |
| 2001/0037371 A1 | 11/2001 | Ohran |
| 2001/0049739 A1 | 12/2001 | Wakayama et al. |
| 2002/0026558 A1 | 2/2002 | Reuter |
| 2002/0029256 A1 | 3/2002 | Zintel |
| 2002/0029286 A1 | 3/2002 | Gioquindo et al. |
| 2002/0031086 A1 | 3/2002 | Welin |
| 2002/0039196 A1 | 4/2002 | Chiarabini |
| 2002/0052962 A1 | 5/2002 | Cherkasova et al. |
| 2002/0062387 A1 | 5/2002 | Yatziv |

| | | | |
|---|---|---|---|
| 2002/0065875 | A1 | 5/2002 | Bracewell et al. |
| 2002/0087811 | A1 | 7/2002 | Khare et al. |
| 2002/0091830 | A1 | 7/2002 | Muramatsu |
| 2002/0126658 | A1 | 9/2002 | Yamashita |
| 2002/0133539 | A1 | 9/2002 | Monday |
| 2002/0165978 | A1 | 11/2002 | Chui |
| 2003/0018784 | A1 | 1/2003 | Lette et al. |
| 2003/0023811 | A1 | 1/2003 | Kim et al. |
| 2003/0026246 | A1 | 2/2003 | Huang et al. |
| 2003/0041138 | A1 | 2/2003 | Kampe |
| 2003/0065733 | A1 | 4/2003 | Pecone |
| 2003/0069995 | A1 | 4/2003 | Fayette |
| 2003/0070144 | A1 | 4/2003 | Schnelle |
| 2003/0081592 | A1 | 5/2003 | Krishnarajah et al. |
| 2003/0093567 | A1 | 5/2003 | Lolayekar |
| 2003/0118053 | A1 | 6/2003 | Edsall et al. |
| 2003/0130986 | A1 | 7/2003 | Tamer et al. |
| 2003/0161312 | A1 | 8/2003 | Brown et al. |
| 2003/0172157 | A1 | 9/2003 | Wright et al. |
| 2003/0182349 | A1 | 9/2003 | Leong et al. |
| 2003/0202510 | A1 | 10/2003 | Witkowski et al. |
| 2003/0204611 | A1 | 10/2003 | McCosh et al. |
| 2004/0025477 | A1 | 2/2004 | Sichera et al. |
| 2004/0047367 | A1 | 3/2004 | Mammen |
| 2004/0078465 | A1 | 4/2004 | Coates et al. |
| 2004/0088293 | A1 | 5/2004 | Daggett |
| 2004/0100952 | A1 | 5/2004 | Boucher et al. |
| 2004/0181476 | A1 | 9/2004 | Smith et al. |
| 2004/0184455 | A1 | 9/2004 | Lin |
| 2005/0033740 | A1 | 2/2005 | Cao et al. |
| 2005/0102522 | A1 | 5/2005 | Kanda |
| 2005/0138003 | A1 | 6/2005 | Glover |
| 2005/0144199 | A2 | 6/2005 | Hayden |
| 2005/0166022 | A1 | 7/2005 | Watanabe |
| 2005/0175005 | A1 | 8/2005 | Brown |
| 2005/0198371 | A1 | 9/2005 | Smith et al. |
| 2005/0246401 | A1 | 11/2005 | Edwards et al. |
| 2005/0267929 | A1 | 12/2005 | Kitamura |
| 2005/0270856 | A1 | 12/2005 | Earhart et al. |
| 2005/0286517 | A1 | 12/2005 | Babbar et al. |
| 2006/0036602 | A1 | 2/2006 | Unangst et al. |
| 2006/0133365 | A1 | 6/2006 | Manjunatha et al. |
| 2006/0168345 | A1 | 7/2006 | Siles et al. |
| 2006/0176903 | A1 | 8/2006 | Coulier |
| 2007/0101023 | A1 | 5/2007 | Chhabra et al. |
| 2007/0110047 | A1 | 5/2007 | Kim |
| 2008/0181158 | A1 | 7/2008 | Bouazizi et al. |
| 2008/0279106 | A1 | 11/2008 | Goodfellow et al. |

FOREIGN PATENT DOCUMENTS

| | | |
|---|---|---|
| EP | 0485110 | 5/1992 |
| EP | 0654736 | 5/1995 |
| EP | 0700231 | 3/1996 |
| EP | 0706113 | 4/1996 |
| JP | 2001094987 | 4/2001 |
| JP | 2001359200 | 12/2001 |
| JP | 2002252880 | 9/2002 |
| JP | 2005265914 | 9/2005 |
| WO | WO/01/01270 | 4/2001 |
| WO | WO02/15018 | 2/2002 |
| WO | WO2004025477 | 3/2004 |

OTHER PUBLICATIONS

B. Quinn et al. IP Multicast Applications: Challenges and Solutions. Sep. 2001. Network Working Group, RFC 3170.

Thomas E. Anderson, Michael D. Dahlin, Jeanna M. Neefe, David A. Patterson, Drew S. Roselli, and Randolph Y. Wang, Serverless network file systems. Dec. 1995. In Proceedings of the 15th Symposium on Operating Systems Principles.

International Search Report for Application No. PCT/US02/40205 dated May 27, 2004.

Ki-II Kim et al., "Internet Multicast Provisioning Issues for Hierarchical Architecture", 2001, IEEE.

Lee et al. "A Comparison of Two Distributed Disk Systems" Digital Systems Research Center—Research Report SRC-155, Apr. 30, 1998, XP002368118.

Lee and Thekkath, "Petal: Distributed Virtual Disks", Systems Research Center.

PCT International Search Report for PCT App. No. PCTUS05/01542 dated Aug. 25, 2008.

Bruschi and Rosti, "Secure multicast in wireless networks of mobile hosts: protocols and issues", Mobile Networks and Applications, vol. 7, issue 6 (Dec. 2002), pp. 503-511.

"Computer Networking Essentials" Copyright 2001, Cisco Systems, Inc., 2001.

Satran et al. "Internet Small Computer Systems Interface (iSCSI)" IETF Standard, Internet Engineering Task Force, IETF, CH, Apr. 2004, XP015009500, ISSN: 000-0003.

Lee et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, Oct. 1, 1996, pp. 84-92, XP000681711, ISBN: 0-89791-767-7.

VMWare Workstations Users Manual, Version 3.2, VMWare, Inc., Copyright 1998-2002.

"Limited distributed DASD Checksum, a RAID Hybrid" IBM Technical Disclosure Bulletin, vol. 35, No. 4a, Sep. 1992, pp. 404-405, XP000314813 Armonk, NY, USA.

Kim et al., "Internet multicast provisioning issues for hierarchical architecture", Networks, 2001, Proceedings, Ninth IEEE International Conference, published Oct. 12, 2001, pp. 401-404.

Satran et al., iSCSI, Internet Draft draft-ietf-ips-iscsi-19.txt.

Chavez, A Multi-Agent System for Distributed Resource Allocation, MIT Media Lab, XP-002092534.

Garth A. Gibson, et al., File Server Scaling with Network-Attached Secure Disks; Joint International Conference on Measurement and Modeling of Computer Systems Proceedings of the 1997 ACM Sigmetrics international conference on Measurement and modeling of computer systems; pp. 272-284; 1997.

WebTen User's Guide; Version 3.0, Jan. 2000; http://www.tenon.com/products/webten/WebTenUserGuide/1_Introduction.html.

Virtual Web mini-HOWTO; Jun. 6, 2001; Parag Mehta; www.faqs.or/docs/Linux-mini/Virtual-Web.html.

Chad Robinson, The Guide to Virtual Services, Linux Journal, vol. 1997 Issue 35, Mar. 1997.

Micah Beck et al., An End-to-End Approach for Globally Scalable Network Storage, ACM SIGCOMM Computer Communication Review, vol. 32, Issue 4 (Oct. 2002), Proceedings of the 2002 SIGCOMM conference; pp. 339-346, 2002.

Garth A. Gibson et al., A Cost Effective High-Bandwidth Storage Architecture;ACM SIGOPS Operating Systems Review, vol. 32, Issue 5, pp. 91-103, 1998.

WebTen User's Guide; Version 7.0, Mar. 2008; http://www.tenon.com/products/webten/WebTenUserGuide/8_VirtualHosts.html, Chapter 8.

Office Action re U.S. Appl. No. 10/473,509 dated Jul. 25, 2005.

Office Action re U.S. Appl. No. 10/473,509 dated Jan. 25, 2008.

Final Office Action re U.S. Appl. No. 10/473,509 dated Nov. 12, 2008.

Office Action re U.S. Appl. No. 10/473,509 dated Apr. 14, 2009.

Final Office Action re U.S. Appl. No. 10/473,509 dated Nov. 20, 2009.

Office Action re U.S. Appl. No. 10/473,509 dated Feb. 16, 2010.

Office Action re U.S. Appl. No. 10/473,509 dated Jul. 1, 2010.

Office Action re U.S. Appl. No. 11/243,137 dated Mar. 27, 2008.

Final Office Action re U.S. Appl. No. 11/243,137 dated Nov. 10, 2008.

Office Action re U.S. Appl. No. 11/243,137 dated Apr. 2, 2009.

Final Office Action re U.S. Appl. No. 11/243,137 dated Oct. 28, 2009.

Final Office Action re U.S. Appl. No. 11/243,137, dated Mar. 17, 2010.

Office Action re U.S. Appl. No. 11/479,711 dated Jul. 11, 2007.

Final Office Action re U.S. Appl. No. 11/479,711 dated Jan. 10, 2008.

Office Action re U.S. Appl. No. 11/479,711 dated Oct. 2, 2008.
Final Office Action re U.S. Appl. No. 11/471,711 dated Apr. 1, 2009.

* cited by examiner

Drive 10

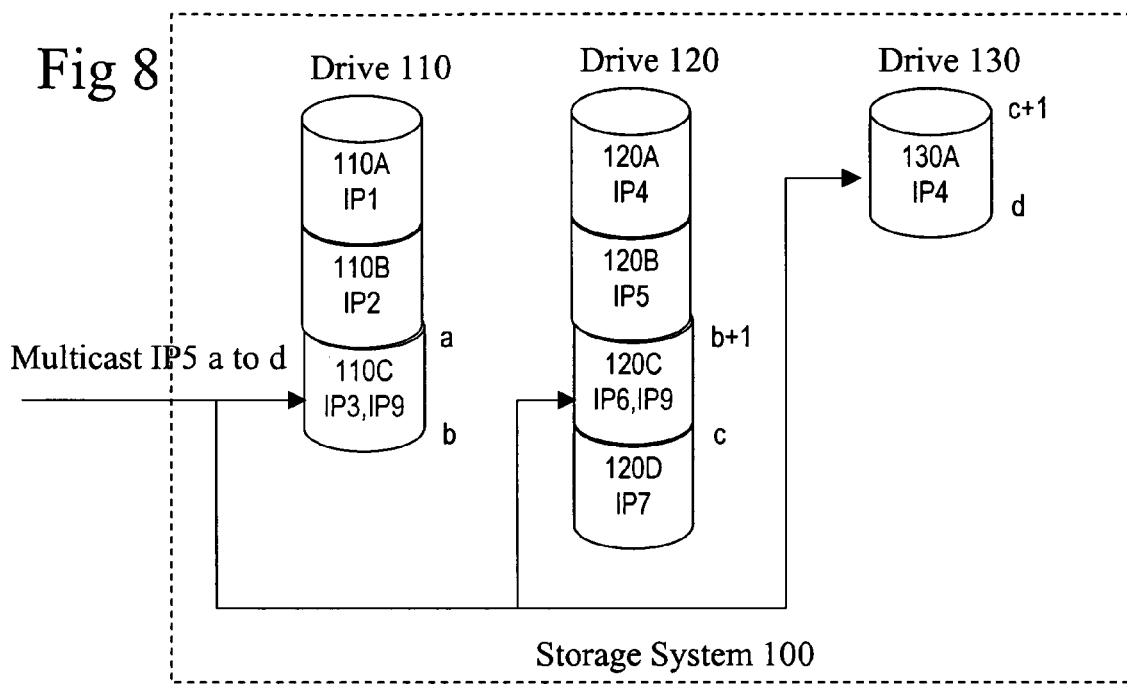
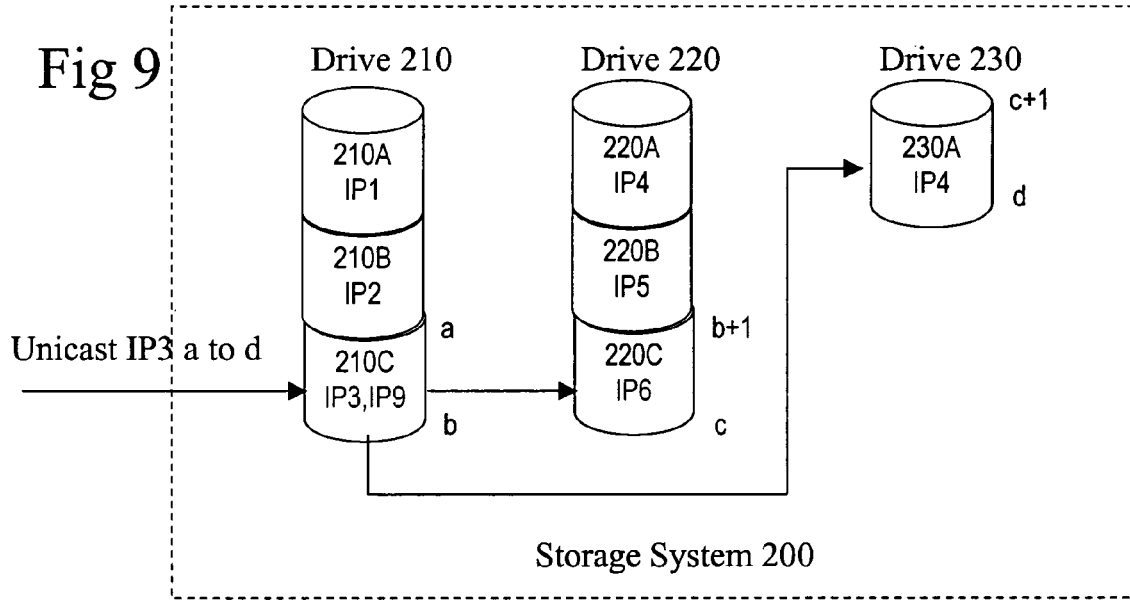

DISK DRIVE PARTITIONING METHODS AND APPARATUS

This application is a divisional of U.S. Ser. No. 10/473,509 filed on Mar. 25, 2004; which is a national phase of PCT application number PCT/US02/40199 filed on Dec. 16, 2002; which claims priority to provisional application number 60/425,867 filed on Nov. 12, 2002.

FIELD OF THE INVENTION

The field of the invention is data storage devices.

BACKGROUND OF THE INVENTION

There is a trend within the field of electronics to physically (i.e. geographically) disaggregate functionality, and to rely instead on networked resources. Of special interest are resources available over a packet communications network such as the Internet. In addition to the data being transferred, packets include header information such as type of data contained in the packet, i.e. HTML, voice, ASCII, etc., and origination and destination node information. The header information permits error checking, and routing across packet switched networks such as the Internet between devices that may be widely spaced apart. The header information also allows extremely disparate devices to communicate with each other—such as a clock radio to communicate with a computer. Recently published US patent application no. 20020031086, (Welin, Mar. 14, 2002) refers to linking "computers, IP phones, talking toys and home appliances such as refrigerators, microwave ovens, bread machines, blenders, coffee makers, laundry machines, dryers, sweepers, thermostat assemblies, light switches, lamps, fans, drape and window shade motor controls, surveillance equipment, traffic monitoring, clocks, radios, network cameras, televisions, digital telephone answering devices, air conditioners, furnaces and central air conditioning apparatus."

Communications with storage devices has not kept pace with the trend to disaggregate resources. Disk access has always been under the control of a disk operating system such as DOS, or Microsoft® Windows®. Unfortunately, putting the operating system at the conceptual center of all computing devices has resulted in a dependence on such operating systems, and has tended to produce ever larger and more complicated operating systems. Now that many electronic devices, from personal digital assistants to telephones, digital cameras, and game consoles, are becoming smaller and ever more portable, the dependence on large operating systems has become a liability. One solution is to provide a stripped-down operating system that requires much less overhead. Microsoft® CE® is an example. That solution, however, sacrifices considerable functionality present in the larger systems.

What is needed is a storage device that can be directly accessed by multiple other devices, without the need to go through an operating system.

SUMMARY OF THE INVENTION

In the present invention a storage device has partitions that are separately addressed by distinct IP addresses. This allows direct access of the partitions,.on a peer-to-peer basis, by any other device that can communicate using IP. Many limitations on access to the storage device can thereby be eliminated, including geographical limitations, and the need for a given storage partition to be under the central control of a single operating system.

Preferred storage devices support spanning between or among partitions of the same device, as well as between or among different storage devices. Both multicast and proxy spanning are contemplated.

Combinations of the inventive storage devices with each other, and with prior art storage devices are contemplated, in all manner of mirroring and other arrangements.

In still other aspects of the invention, a given storage device can comprise one or more types of media, including any combination of rotating and non-rotating media, magnetic and optical, and so forth.

Various objects, features, aspects and advantages of the inventive subject matter will become more apparent from the following detailed description of preferred embodiments, along with the accompanying drawing figures.

BRIEF DESDCRIPTION OF THE DRAWING

FIG. 8 is a schematic of a storage system in which three storage devices are logically coupled using multicast spanning.

FIG. 9 is a schematic of a storage system in which three storage devices are logically coupled using proxy spanning.

DETAILED DESCRIPTION

Figure 1:
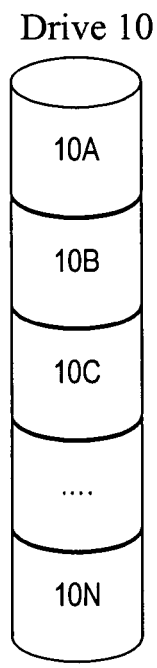
FIG. 1 is a schematic of a prior art disk drive split into multiple partitions, but where the entire memory is accessed using a single IP address.

Prior art FIG. 1 generally depicts a disk drive 10 that is split into multiple partitions $10_A$, $10_B$, $10_C$ . . . $10_N$. The entire storage area is addressed using a single address $IP_1$, with individual blocks of data being addressed by a combination of $IP_1$ and some other information such as partition and offset, or Logical Block Address (LBA). The data is thus always accessed under the control of a disk operating system that provides the additional information. For that reason drive 10 is usually located very close to the processor that runs the operating system, and is usually connected to a hard bus of a computer, RAID or other system.

It is known to format the various partitions 10A . . . 10N differently from one another, under control of different operating systems. However, the entire memory space comprises a single media type, namely rotating magnetic memory, even though there may be some sort of RAM buffer (not shown).

It should be appreciated that the term "IP" is used herein in a broad sense, to include any networking protocol. Thus, an IP address is used as a euphemism for a network address.

Figure 2:
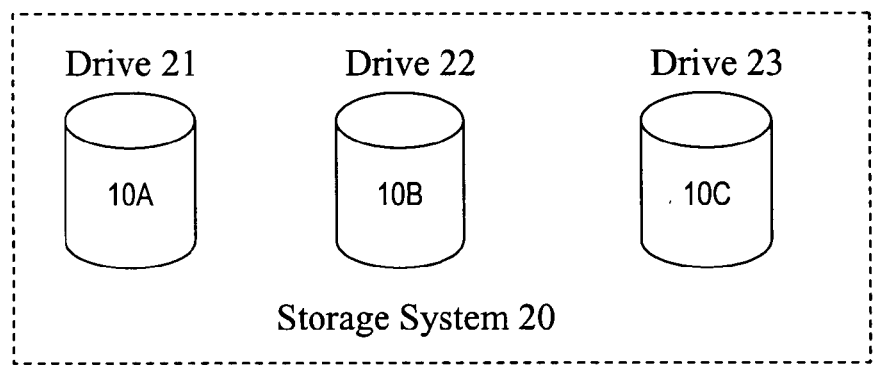
FIG. 2 is a schematic of a prior art storage system in which three disk drives are addressed in their entireties using three different IP addresses.

Prior art FIG. 2 generally depicts a storage system 20 in which three disk drives 21, 22, 23 are addressed using three different IP addresses, IP1, IP2, and IP3. The drives can have multiple partitions (drive 21 has three partitions $21_A$, $21_B$, $21_C$ (not shown), and drive 23 has two partitions $23_A$ and $23_B$ (not shown)), but here again individual blocks of data are addressed using a combination of the IP address, some other information such as partition and offset, or LBA. Drives 21, 22, 23 can be spanned and/or mirrored, but the data on each drive is always accessed using that drive's particular IP address.

Figure 3:
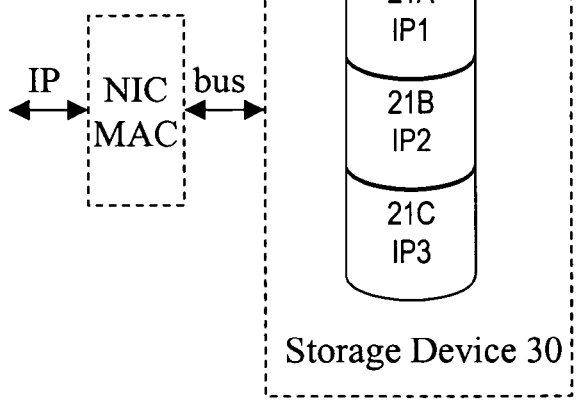
FIG. 3 is a schematic of a storage device having multiple partitions that are separately addressed by different IP addresses.

In FIG. 3 is a storage device 30 according to the present invention has three partitions $21_A$, $21_B$, $21_C$, which are separately addressed by different IP addresses $IP_1$, $IP_2$, $IP_3$, respectively. Those skilled in the art will appreciate that showing a small plurality of partitions is merely a matter of convenience, in this and other figures, and that storage device 30 could have any practical number of partitions. Similarly, it should be appreciated that depicting storage devices without partitions indicates that such devices have no partitions.

Utilizing IP addresses to route packets directly to and from partitions facilitates the use of very light communication protocols. In particular, the partitions may be directly addressed at the IP level of TCP/IP or UDP/IP stack. It should be appreciated, however, that in order make use of the IP addresses, the storage device 30 (and indeed the various partitions) would need to have sufficient functionality to communicate using IP. That functionality could be designed into the devices (or partitions), or it could be added onto storage devices using an IP adapter 32 (not shown). Indeed, the adapter in such circumstances would essentially be a simple block-to-packet and packet-to-block translator.

Storage device 30 can be connected to any suitable bus by any suitable means. Thus, the operative principles herein can operate across a wide variety of physical buses and protocols, including ATA, ATAPI, SCSI, Fiber CH, PCMCIA, CardBus, and USB. Storage device 30 can also alternatively or additionally operate across a network acting as a virtual IP bus, with the term "IP" being used herein generically with reference to any internetworking protocol that handles packets. It is contemplated, for example, that a user may have a stand-alone storage device that communicates wirelessly with a Local Area Network (LAN), which in turn may be connected to a WAN or to the Internet. Other devices that are also connected to the network (whether in the home, office, or elsewhere) could directly access one or more partitions of the storage device. For example, an IP capable television (not shown) could display images or movies stored on one partition, while a digital camera (not shown) could store/retrieve images on another partition. Still another partition might hold an operating system and office software for use with a laptop, or even an IP capable display and IP capable keyboard and mouse. Printing from any of the partitions might occur on an IP capable printer that is also connected wirelessly, or by hardwire, to the network.

An interesting corollary is that the partitions or other elements can all communicate as peers on a peer-to-peer network. As used herein, the term "element" refers to a hardware unit that is a functional portion of a device, and traditionally communicates with other units of the same device across a bus, without having its own IP address. This can completely eliminate dependence on any particular operating system, and can eliminate operating systems altogether. In addition, many of the elements attached to the network will be dependent on other elements attached to the network to perform tasks that are not within their individual capacities, and will be able to discover, reserve, and release the resources of other peers needed to perform such tasks. Peers will preferably be able to discover the other elements attached to the network, the characteristics of the other elements attached to the network, and possibly the contents of at least some of the elements attached to the network. Such discovery is accomplished without the assistance of a master device, and will preferably involve direct communication between the peer elements.

Preferred networks will be masterless in that all elements have equal access to the network and the other elements attached to the network. The peer elements of the network will preferably communicate with each other utilizing low-level protocols such as those that would equate to those of the transport and lower layers of the OSI model. Preferred embodiments will utilize TCP and UDP IP protocols for communication between elements.

Storage device 30 is preferably able to dynamically create partitions upon receipt of requests from network elements. For example, when a network element requests use of device 30, the network element may provide a unique identifier, possibly a name, to storage device 30, which in turn associates the identifier with any newly created partition. In some instances the network element may also request a particular storage size to be allocated, including all of the remaining storage available on the storage device 30.

In preferred embodiments, the IP addresses for such partitions are obtained from an address server such as a DHCP server upon request from the storage device 30. It is important to note, however, that address allocation devices such as DHCP servers are not masters, since they don't control the network, elements coupled to the network, or the sharing of resources between elements. Assignment of IP addresses to partitions may additionally or alternatively occur during initialization of the device, such as when it is first turned on.

Since storage device 30 may be associated with only a single network interface card (NIC), it is preferred that storage elements be able to obtain multiple IP addresses despite having a single NIC and a single media access control (MAC) address. This can be accomplished by providing a unique partition identifier to an address server when trying to obtain a IP address from the address server. It is contemplated that associating a name provided by an element with any partition created for that element makes it possible to identify each of the partitions of a storage element, despite the fact that IP address associated with each partition may have changed since the partition was created.

Additional details can be found in concurrently filed PCT application No. PCT/US02/40205, entitled "Communication Protocols, Systems and Methods" and PCT application No. PCT/US02/40198, entitled "Electrical Devices With Improved Communication", the disclosures of which are incorporated herein by reference.

Figure 4:
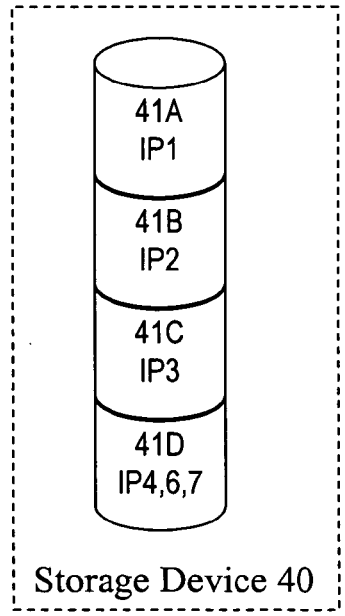
FIG. 4 is a schematic of a storage device having multiple partitions that are separately addressed by different IP addresses, and some of the partitions are addressed using multiple IP addresses.

In FIG. 4, storage device 40 is similar to storage device 30 in that it has multiple partitions $41_A$, $41_B$, $41_C$, $41_D$ that are separately addressed by different IP addresses $IP_1$, $IP_2$, $IP_3$, $IP_4$, respectively. But here some of the partitions are addressed using multiple IP addresses. In particular, partition $41_A$ is addressed with $IP_1$ and $IP_5$. Partition $41_D$ is addressed with $IP_4$, $IP_6$ and $IP_7$.

Figure 5:
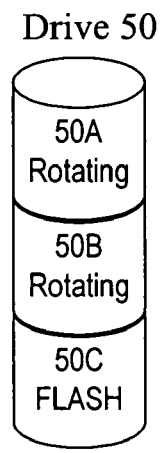
FIG. 5 is a schematic of a storage device having multiple partitions comprising different storage media.

In FIG. 5 a storage device 50 has multiple partitions comprising different storage media. In this particular example there are 2 partitions of rotating media $50_A$, $50_B$, one partition of flash memory $50_C$. All other practical combinations of these and other media are also contemplated. As in FIG. 3, the various partitions are separately addressed by different IP addresses $IP_1$, $IP_2$, $IP_3$, respectively.

Figure 6:
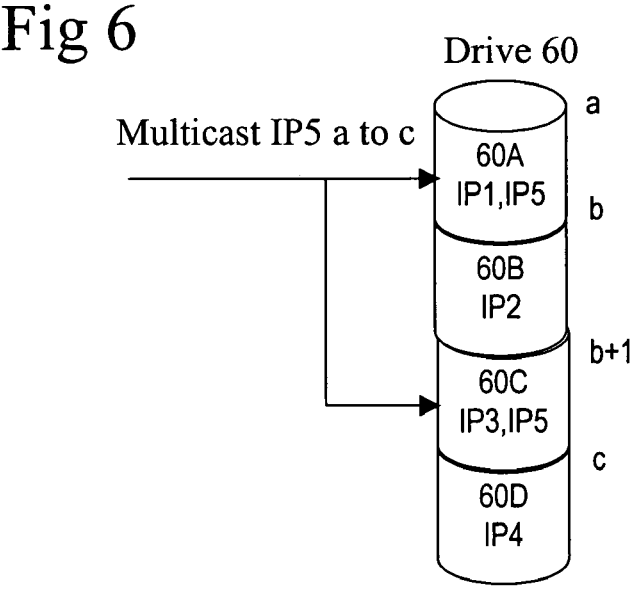
FIG. 6 is a schematic of a storage device having multiple partitions, two of which are spanned using multicast spanning.

In FIG. 6 a storage device 60 has multiple partitions $60_A$, $60_B$, $60_C$, $60_D$, addressed by IP addresses $IP_1$, $IP_2$, $IP_3$, $IP_4$, and $IP_5$ (multicast) respectively. Two of these partitions, $60_A$ and $60_C$, are spanned in that partition $60_A$ extends from logical address a to logical address b, while partition $60_C$ continues from logical address b+1 to logical address c. The spanned set is thus logical address a to logical address c. The spanning here is multicast spanning, because the partitions share multicast $IP_5$ which is used to address both partitions $60_A$ and $60_C$.

Figure 7:
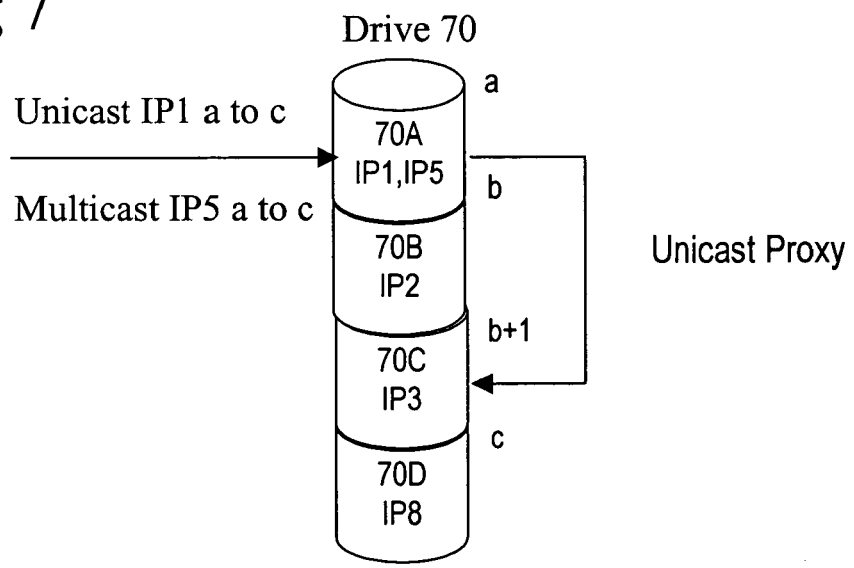
FIG. 7 is a schematic of a storage device having multiple partitions, two of which are spanned using proxy spanning.

In FIG. 7 a storage device 70 has multiple partitions $70_A$, $70_B$, $70_C$, $70_D$, addressed by IP addresses $IP_1$, $IP_2$, $IP_3$, $IP_8$, respectively. (The use of $IP_8$ here rather than $IP_4$ is intended to illustrate that the IP addresses need not be consecutive in any manner.) Here again two of the partitions are spanned, $70_A$ and $70_C$, in that partition $70_A$ extends from logical address a to logical address b, while partition $70_C$ continues from logical address b+1 to logical address c. The spanned set is thus once again logical address a to logical address c. Here, however, we are dealing with proxy spanning as opposed to multicast spanning. $IP_1$ is used to address partition $70_A$, while the second part of the spanned data, in partition $70_C$, is addressed by the IP1 proxy using $IP_3$. Of course, it is possible to combine multicast spanning and proxy spanning within the same storage device.

In FIG. 8 a storage system 100 has three storage devices 110, 120, and 130 coupled to depict multicast spanning. Device 110 has three partitions $110_A$, $110_B$ and $110_C$, which are separately addressed using IP addresses $IP_1$, $IP_2$, and $IP_3$, respectively. Device 120 has four partitions $120_A$, $120_B$, $120_C$, and $120_D$, which are separately addressed using IP addresses $IP_4$, $IP_5$, $IP_6$, and $IP_7$, respectively. Device 130 is not partitioned, which for our purposes is the same as saying that it only has one partition. The entirely of the storage area of device 130 is addressed using IP address $IP_8$. The spanning in this case is among all three drives. Partition 110C extends from logical address a to logical address b; partition 120D continues from logical address b+1 to logical address c, and the data space of device 130 extends from logical address c+1 to logical address d. The data set extends from logical address a to logical address d.

FIG. 9 is similar to FIG. 8, in that spanning occurs across three drives, and the data set extends from logical address a to logical address d. The main conceptual difference is that the storage devices are logically coupled using proxy spanning rather than multicast spanning. Here, device 210 has three partitions $210_A$, $210_B$ and $210_C$, which are separately addressed using IP addresses $IP_1$, $IP_2$, and $IP_3$, respectively. Device 230 is not partitioned. The entirely of the storage area of device 230 is addressed using IP address $IP_4$. Device 220 has three partitions, $220_A$, $220_B$ and $220_C$, which are separately addressed using IP addresses $IP_4$, $IP_5$, and $IP_6$, respectively. Partition $210_C$ extends from logical address a to logical address b; the data space of partition $220_C$ continues from logical address b+1 to logical address c, and partition 230 extends from logical address c+1 to logical address d.

As elsewhere in this specification, the specific embodiments shown with respect to FIG. 9 are merely examples of possible configurations. A greater or lesser number of storage devices could be utilized, and indeed spanning may be protean, in that devices and/or partitions may be added to or dropped from the spanning over time. There can also be any combination of multicast and proxy spanning across and/or within storage devices, which may have the same or different media. Moreover, the use of IP addresses facilitates physically locating the various storage devices virtually anywhere an IP network can reach, regardless of the relative physical locations among the devices.

Figure 10:
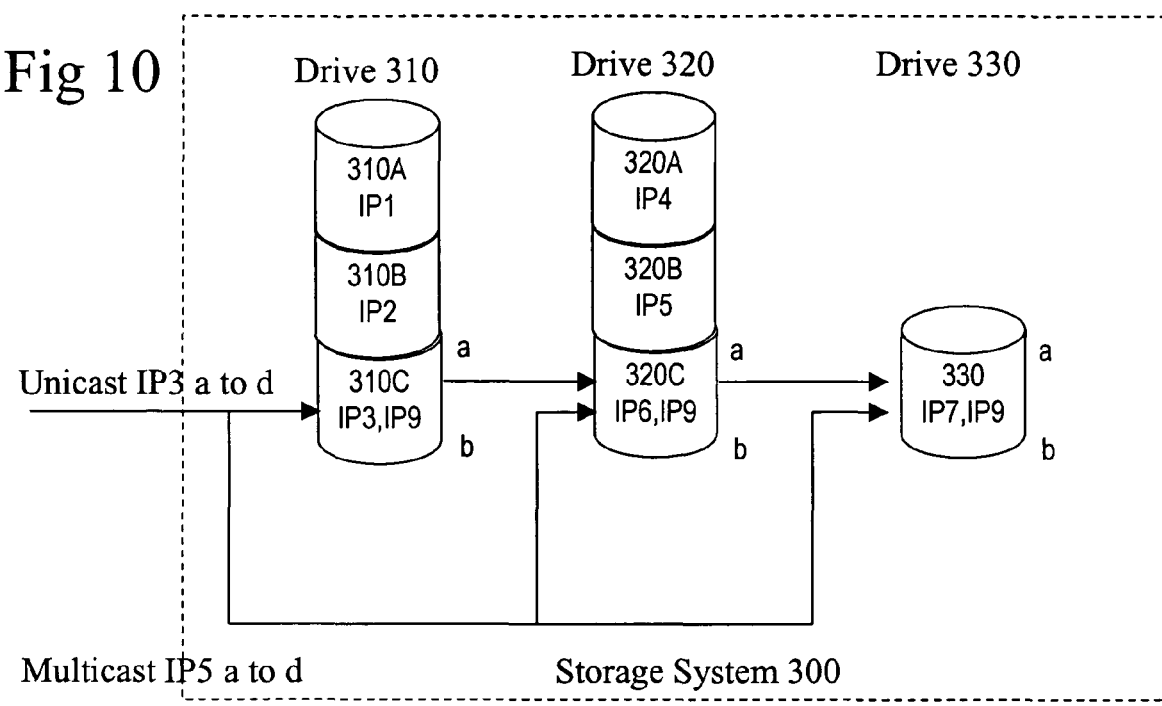
FIG. 10 is a schematic of a storage system in which partitions of a first storage device are mirrored on partitions of one or more additional storage device using multicast mirroring.

In FIG. 10 a storage system 300 provides mirroring of partitions between three different physical storage devices 310, 320 and 330. This could be done by proxy, in a manner analogous to that described above for proxy spanning, or in higher performance systems using multicasting. Thus, partitions in multiple storage devices are addressed using the same IP address. In this particular embodiment, storage device 310 has partitions $310_A$, $310_B$, and $310_C$, addressed using IP addresses $IP_1$, $IP_2$, $IP_3$ and IP9. Storage device 320 has partitions $320_A$, $320_B$, and $320_C$, addressed using IP addresses $IP_4$, $IP_5$, IP6 and $IP_9$. Write requests to $IP_3$ or $IP_9$ will result in partition $310_C$ $320_C$ and $330_C$ storing the same data. Read requests to $IP_1$ address will result in $310_C$, $320_C$ and $330_C$ responding with the same information, with presumably the requester using whichever data arrives first. In the Multicast form it may be prefefred that device 310,320 and 330 listen for the first data returned by any member of the mirrored set, and then remove that request from their request que if another device completes the request before they complete the request.

Communications

In preferred embodiments, communications between a storage element and a non-storage element, will utilize a datagram protocol in which data blocks are atomically mapped to a target device. A datagram sent between elements will preferably comprise command (CMD), logical block address (LBA), data, and token fields, and no more than X additional bytes where X is one of 1, 2, 7, 10, 17, and 30. The data field of such a datagram is preferably sized to be the same as the block size (if applicable) of the element to which the datagram is addressed. As such, an element sending a quantity of data to a storage element where the quantity of data is larger than the block size of the storage element will typically divide the quantity of data into blocks having the same size as the blocks of the storage element, assign LBAs to the blocks, and send each block and LBA pair to the storage element in a datagram.

It is preferred that the datagrams be communicated between elements encapsulating them within addressed packets such as IP packets, and the IP address of the encapsulating packet be used to identify both the element a packet is intended to be sent to, and the partition within the element that the datagram pertains to.

It is preferred that datagram recipients handle datagrams on a first come, first served basis, without reordering packets, and without assembling the contents of the data fields of datagrams into a larger unit of data prior to executing a command identified in the CMD field. As an example, an storage element may receive a datagram containing a block of data, an LBA, and a write command. The storage element, without having to wait for any additional packets, utilizes the IP address of the packet enclosing the datagram to identify the partition to be used, and utilizes the LBA to identify the location within the partition at which the data in the data field is to be written.

Handling the data in individual datagrams as they arrive rather than reassembling the data permits the use of an implied ACK for each command. Using an implied rather than an explicit ACK results in a substantial increase in performance.

Marketing of Storage Devices and Adapters

It is contemplated that once persons in the industry recognize the benefits of having storage devices having partitions that are accessed using their own IP addresses, companies will start producing and/or marketing such devices It is also contemplated that companies will start producing and/or marketing adapters that includes a functionality (hardware or software, or come combination of the two) to permit traditional disk drives, flash memories, and other storage devices to operate in that manner.

Thus, methods falling within the inventive subject matter include manufacturing or selling a disk drive or other storage device in which the partitions can utilize their own IP addresses to execute packet communication with other network elements. Other inventive methods include manufacturing or selling adapters that enable prior art type storage devices to do the same. Indeed it is contemplated that companies will recognize that such adapters are available, and will continue to manufacture or sell prior art type storage devices, knowing (or even advertising) that users can employ such adapters to enable the prior art type storage devices to use in an infringing manner.

Thus, specific embodiments and applications of the inventive storage devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus comprising:
    a storage medium;
    a network interface configured to communicatively couple the apparatus to a network; and
    a storage element communicatively coupled to the storage medium and the network interface and configured
        to receive, via the network interface, a request for a partition allocation, the request including a name;
        to create and allocate a partition of the storage medium based at least in part on the request;
        to obtain, from a dynamic host configuration protocol (DHCP) server, an internet protocol (IP) address for the partition of the storage medium; and
        to associate the name with the IP address.

2. The apparatus of claim 1, wherein the request further includes a requested size of the partition allocation.

3. The apparatus of claim 1, wherein the request further includes a token and one or more authentication parameters to secure subsequent access to the partition.

4. The apparatus of claim 1, wherein the storage element is further configured
    to receive, from a requester via the network interface, a release request; and
    to release the partition based at least in part on the release request.

5. The apparatus of claim 4, wherein the requester is a network element.

6. The apparatus of claim 4, wherein the storage element is configured to release the partition by being further configured
    to remove any residual data in the partition;
    to request the DHCP server to release the IP address; and
    to place the partition into an allocation pool for a future allocation.

7. The apparatus of 1, wherein the storage element is further configured
    to receive, from a requester via the network interface, a broadcast name resolution request including a requested name to resolve;
    to determine that the requested name is the name; and
    to respond, to the requester via the network interface, with the IP address.

8. The apparatus of claim 7, wherein the requester is a network element.

9. The apparatus of claim 1, wherein, prior to receiving the request, the storage element is configured
    to receive, from a network element via the network interface, a broadcast find request; and
    to provide the network element with a root node IP address of the storage medium based at least in part on the broadcast find request.

10. The apparatus of claim 1, wherein the storage element is configured to operate independently of an operating system.

11. A method comprising:
    receiving, from a network element via a network interface, a request for a partition allocation, the request including a name;
    creating and allocating a partition of a storage medium based at least in part on the received request;
    obtaining, from a dynamic host configuration protocol (DHCP) server, an internet protocol (IP) address for the partition of the storage medium; and
    associating the name with the IP address.

12. The method of claim 11, further comprising:
    securing access to the allocated partition based at least in part on a token and one or more authentication parameters received in the request.

13. The method of claim 11, further comprising:
    receiving, from a requester via the network interface, a release request; and
    releasing the partition based at least in part on the release request.

14. The method of claim 13, wherein said releasing the partition comprises:
    removing any residual data in the partition;
    requesting the DHCP server to release the IP address; and
    placing the partition into an allocation pool for a future allocation.

15. The method of claim 14, further comprising:
    receiving, from the requester via the network interface, a broadcast name resolution request including a requested name to resolve;
    determining that the requested name is the name; and
    responding, to the requester via the network interface, with the IP address.

16. An apparatus comprising:
    a network interface; and
    a network element communicatively coupled to the network interface and configured
        to transmit, to a storage element via the network interface, a request for a partition of a storage medium associated with the storage element to be created and allocated to the network element, the request including a name to be used to identify a partition created in reponse to the request; and
        to receive, from the storage element via the network interface, an internet protocol (IP) address to associate with the name.

17. The apparatus of claim 16, wherein the network interface is further configured to transmit, prior to transmitting the request, a broadcast message including the name to determine that the name is unique to all recipients of the broadcast message.

18. The apparatus of claim 16, wherein the request further includes a token and the network element is further configured to provide the token to another network element to enable the another network element to access a partition created in response to the request.

19. The apparatus of claim 16, wherein the network element is further configured
to transmit, to the storage element via the network interface, a resource availability request; and
to receive, from the storage element via the network interface, a resource availability response indicating an amount of storage available on the storage medium.

20. An apparatus comprising:
one or more storage media; and
a storage element communicatively coupled to the one or more storage media and configured
to partition the one or more storage media into a plurality of partitions; and
to obtain, from a dynamic host configuration protocol (DHCP) server, a unique internet protocol (IP) address for each partition of the plurality of partitions, and a multicast IP address for at least two partitions of the plurality of partitions.

21. The apparatus of claim 20, wherein the at least two partitions include a spanned set of logical addresses.

22. The apparatus of claim 20, wherein the storage element is further configured to receive one or more requests from at least one network element and to partition the one or more storage media and to obtain the unique IP addresses based at least in part on the one or more requests.

23. An apparatus comprising:
a storage medium; and
a storage element communicatively coupled to the storage medium and configured
to partition the storage medium into a plurality of partitions; and
to obtain, from a dynamic host configuration protocol (DHCP) server, a first unique internet protocol (IP) address for a first partition of the plurality of partitions and a second unique IP address for the first partition.

24. The apparatus of claim 23, wherein the second unique IP address is associated with a logical address that spans the first partition and one or more other partitions.

25. The apparatus of claim 23, wherein the storage element is further configured to receive one or more requests from at least one network element and to partition the storage medium and to obtain the first unique IP address and the second unique IP address based at least in part on the one or more requests.

* * * * *

UNITED STATES PATENT AND TRADEMARK OFFICE
CERTIFICATE OF CORRECTION

PATENT NO. : 7,870,271 B2
APPLICATION NO. : 11/243143
DATED : January 11, 2011
INVENTOR(S) : Frank et al.

Page 1 of 1

It is certified that error appears in the above-identified patent and that said Letters Patent is hereby corrected as shown below:

Title page, item (54), under "Title", in Column 1, Line 2, delete "APPARATUS" and insert -- APPARATUSES --.

Title page, item (76), under "Inventors", in Column 1, Line 5, delete "Manscal," and insert -- Mariscal, --.

Page 3, item (56), under "Other Publications", in Column 2, Line 8, delete "PCTUS05/01542" and insert -- PCT/US05/01542 --.

Page 4, item (56), under "Other Publications", in Column 1, Line 2, delete "11/471,711" and insert -- 11/479,711 --.

Column 1, line 2 (in the Title), delete "APPARATUS" and insert -- APPARATUSES --.

Column 8, line 1, in Claim 7, delete "1," and insert -- claim 1, --.

Column 8, line 62, in Claim 16, delete "reponse" and insert -- response --.

Signed and Sealed this
Twenty-fourth Day of May, 2011

David J. Kappos
*Director of the United States Patent and Trademark Office*